United States Patent [19]

Propster

[11] 4,405,350

[45] Sep. 20, 1983

[54] DRYING AND PREHEATING AGGLOMERATES CONTAINING CLAY HAVING COARSE PARTICLE SIZE

[75] Inventor: Mark A. Propster, Gahanna, Ohio

[73] Assignee: Owens-Corning Fiberglas Corporation, Toledo, Ohio

[21] Appl. No.: 176,165

[22] Filed: Aug. 7, 1980

[51] Int. Cl.$^3$ .......................... C03B 1/00; C03B 3/00
[52] U.S. Cl. ...................................................... 65/27
[58] Field of Search ...................... 65/27; 106/DIG. 8

[56] References Cited

U.S. PATENT DOCUMENTS 4,074,990  2/1978  Brzozowski et al. ................... 65/27
4,225,332  9/1980  Tsay .................................... 65/27 X

OTHER PUBLICATIONS

"Volclay, Wyoming Bentonite", American Colloid Co., Technical Data Sheet, Data No. 100, 1970.
Harman et al, "Fundamental Properties of Raw Clays Influencing Their Use", Journal of American Ceramic Society, vol. 28, No. 4, 1945, pp. 110–118.
"Bentonite", Kirk-Othmer, Enc. of Chem. Technology, Rev. Ed., vol. 3, 1971, pp. 339-358.

Primary Examiner—Richard V. Fisher
Attorney, Agent, or Firm—Ronald C. Hudgens; Patrick P. Pacella

[57] ABSTRACT

Glass batch agglomerates are formed, fed to a vertical bed preheat hopper, dried and preheated with furnace exhaust gases, and then fed to a glass melting furnace. The green pellets may spall if the batch particle size distribution results in a pellet with insufficient pore volume to degas effectively. By employing clay having a coarse particle size in the glass batch agglomerates, spalling and stack emissions are reduced during drying and preheating.

9 Claims, 1 Drawing Figure

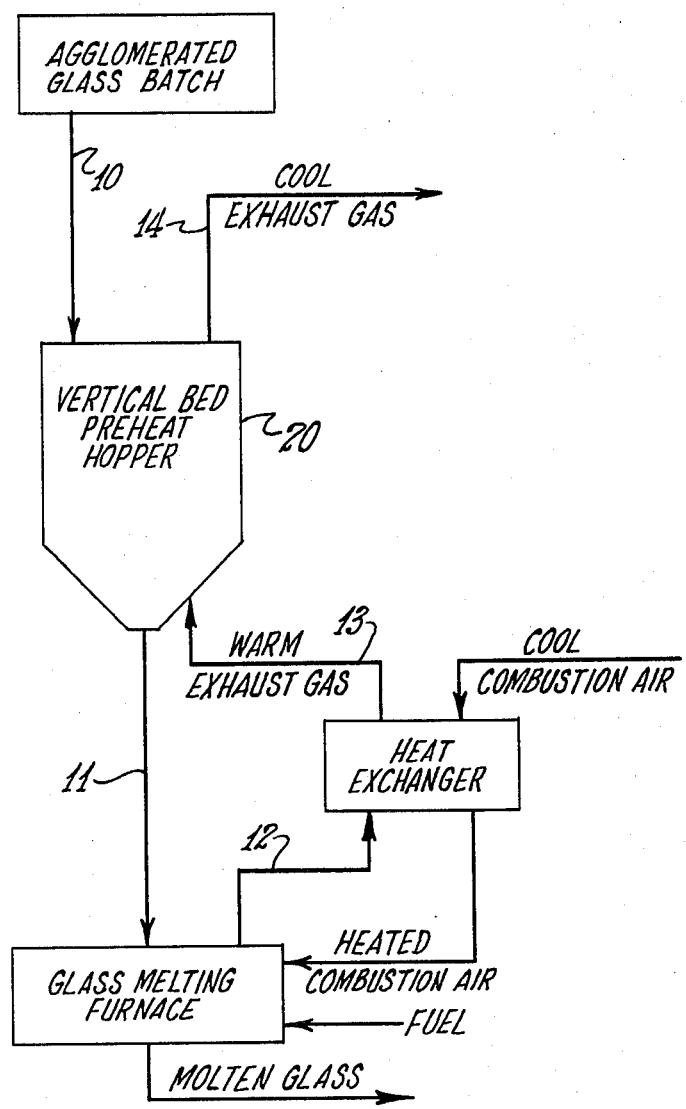

DRYING AND PREHEATING AGGLOMERATES CONTAINING CLAY HAVING COARSE PARTICLE SIZE

TECHNICAL FIELD

This invention relates to a process for drying and preheating agglomerates which then are fed to a glass melting furnace.

BACKGROUND ART

Methods are known in the art for glass manufacturing wherein glass-forming, batch ingredients are compacted into agglomerates and then are dried and heated in a chamber by a direct contact with flue gases from a glass melting furnace so as to produce free-flowing agglomerates which are then conveyed and discharged to the glass melting furnace. These agglomerates are composite, integral, self-supporting masses consisting essentially of all the substantial batch materials and may take the form of balls, extrusions, discs, briquettes, and pellets. The agglomerates are discharged to a vertical bed contained within a chamber and furnace flue gases pass, in direct contact with and countercurrently to, downwardly moving pellets of the bed to preheat them.

One method known in the art to form the agglomerates is to combine the glass forming batch ingredients with a liquid such as caustic or water. In the context of drying and heating water-containing, glass batch agglomerates with flue gases from a fossil fuel fired melting furnace, the most conventional process equipment of the prior art is a shaft type heater, or chamber, i.e., a vertical bed of substantial height, and preferably a bed in which the agglomerates flow downwardly through the chamber and in which the flue gases flow countercurrent to the agglomerates, to substantially continuously, in a single processing operation, dry and preheat them.

This drying and preheating of agglomerates at times may generate high particulate emissions in the flue gases exhausting from the chamber. Observations indicate that the primary source of this high dust load in the preheat hopper effluent is the result of agglomerate spalling, particularly in the upper portion of the agglomerate bed. Wet agglomerate spalling is defined as a loss of agglomerate integrity during the drying process.

DISCLOSURE OF INVENTION

I have discovered that one of the major factors which affects wet agglomerate spalling is the glass batch raw material particle size distribution and resultant agglomerate density. Agglomerates composed of standard batch where standard clay is replaced by clay which possesses a coarser particle size produced a most marked improvement in spalling tendencies. The coarser clay can be bentonitic which swells when it contacts water, thereby further increasing the overall particle size. These two factors result in producing a more porous agglomerate during the drying process where spalling is critical.

BRIEF DESCRIPTION OF THE DRAWINGS

The FIGURE is a flow diagram of this invention in connection with a conventional glass melting furnace and shaft type heater or hopper.

BEST MODE OF CARYING OUT INVENTION

Generally, this invention is employed with a glass melting furnace from which molten glass issues. A shaft type preheater maintains a vertical bed of agglomerates, with the preheater preferably containing an upper substantially cylindrical portion and a lower inverted frusto-conical portion. Hot exhaust gases are conveyed to a lower portion of the preheater and passed countercurrently to the gravitationally downwardly flow of the agglomerates therein so as to preheat the agglomerates to an elevated temperature. The heated agglomerates are discharged from the lower portion of the preheater and without significant cooling, are directly transmitted to a glass melting furnace.

In the FIGURE, agglomerated glass batch 10 is continuously fed countercurrently to the flow of warm exhaust gas 13 in preheat hopper 20. Heated agglomerates 11 then are discharged to a glass melting furnace. Hot exhaust gas 12 from the glass melting furnace is passed through a heat exchanger prior to entering the preheat hopper. Cool exhaust gas 14 leaving the pellet bed are vented to the atmosphere or passed to a dust collector.

Wet pellets spalling is a loss of pellet integrity during the drying process. This loss of integrity can be as complete as the explosion of a pellet to fine particulate or as subtle as the outer pellet shell fracturing or breaking off. It is caused by the inability of the green pellet to degas at the rate at which vapor is being generated within the pellet. Therefore, a pressure build-up occurs within the pellet which ultimately leads to its failure.

Current preheat hoppers have experienced emissions and the process of this invention provides a means for reducing these emissions. Various levels of replacement of the standard clay with a coarser clay such as a bentonitic clay were examined to determine if an optimum concentration of the coarse clay existed. I have defined the spalling parameter as the percent of wet pellets which survive a particular set of drying conditions. Pellet survival is determined visually by insuring no loss in pellet integrity and quantitatively by measuring the surviving pellet physical properties. The amount of clay having a coarse particle size ranges up to 35% by weight of the agglomerates.

EXAMPLE I

A cylindrical pellet reaction chamber for determining pellet spalling was constructed of stainless steel. The chamber was 8 inches in diameter and 20 inches in height. The chamber consisted of two sections: a flow straightening section at the inlet to insure uniform gas flow and temperature into the spalling chamber, followed by the spalling chamber proper. The spalling chamber contained thermocouple ports above a fixed perforated pellet support plate. A movable perforated tray was provided which allowed the pellets charged into the chamber to be easily removed and examined. The gas flow through the pellet bed was measured with a rotometer and the gas preheat temperature was attained and controlled by means of two "heat guns" (electrical resistance heating elements) in series. This device provides for accurate control of the temperature and velocity of the gas which contacts the wet pellets contained in the spalling test chamber during the drying process.

The experimental procedure employed for characterizing pellet spalling is as follows:

1. Set the gas flow rate and temperature at the inlet to the pellet spalling chamber at the desired level.
2. Measure and record green pellet physical properties and the rotometer set point. The temperature at the inlet to the pellet bed and at the exit from the pellet charge contained in the spalling chamber should be checked frequently during the course of an experiment.
3. Charge a known number of fresh green pellets into the chamber.
4. After 15 minutes, remove the pellets from the chamber and record the number of pellets which have survived. Measurement of the physical properties of the pellets which have survived was also performed.

The sequence of experiments proceeds from a low flow rate and temperature set point, where a minimum of three data sets are obtained. This is followed by increasing the gas flow rate into the pellet spalling chamber at the same temperature and again obtaining the required data sets at each velocity. Then the temperature is increased, and the entire process is repeated until sufficent data is gathered. The drying gas temperature and velocity should be increased in magnitude until a level of less than 50 percent pellet survival has been demonstrated. The information obtained results in an operating curve on a temperature-velocity graph for a constant percentage of pellet survivors.

Batch formulations for 2 standard E glass compositions (textiles) are given in Table I.

TABLE I

|  | Weight Percent |
|---|---|
| Standard Batch I | |
| PGS Schuler Flint | 30.5 |
| SMC Limestone | 23.8 |
| Ewing Clay | 30.5 |
| ABC 43% Float Colemanite | 14.1 |
| Sodium Silicofluoride | 1.1 |
| Standard Batch II | |
| PGS Schuler Flint | 31.5 |
| Mississippi Limestone | 25.5 |
| FK Gleason Glay | 31.1 |
| ABC 43% Float Colemanite | 10.8 |
| Fluorspar | 1.2 |

Table II shows the microtrac particle size distribution for various materials. Soft Clark Bentonite clay possesses an overall coarser particle size distribution than the other clays.

TABLE II

| Particle Size (Microns) | CCC Lime (Fine) | Mississippi Lime (Standard) | Mississippi Lime (Coarse) | Soft Clark Bentonite | Gleason Clay | Ewing Clay |
|---|---|---|---|---|---|---|
| 176 | 100.0 | 100.0 | 100.0 | 100.0 | 100.0 | 100.0 |
| 125 | 92.7 | 90.5 | 65.4 | 100.0 | 100.0 | 100.0 |
| 88 | 78.3 | 81.8 | 44.6 | 99.9 | 99.9 | 99.9 |
| 62 | 70.6 | 69.6 | 32.3 | 91.0 | 99.5 | 99.4 |
| 44 | 62.4 | 59.4 | 32.0 | 81.0 | 99.0 | 99.0 |
| 31 | 52.4 | 52.3 | 31.9 | 70.7 | 98.7 | 98.2 |
| 22 | 43.8 | 43.6 | 24.8 | 57.6 | 96.9 | 96.1 |
| 16 | 37.8 | 38.3 | 18.4 | 48.5 | 84.3 | 79.4 |
| 11 | 33.2 | 33.1 | 18.0 | 38.3 | 76.1 | 62.1 |
| 7.8 | 27.0 | 27.9 | 16.9 | 29.4 | 68.3 | 58.0 |
| 5.5 | 23.5 | 22.3 | 16.5 | 23.7 | 60.1 | 49.6 |
| 3.9 | 15.9 | 14.8 | 12.3 | 13.8 | 44.4 | 32.8 |
| 2.8 | 8.3 | 8.0 | 3.2 | 5.7 | 25.3 | 17.1 |
| m2/cm3 | 0.624 | 0.606 | 0.389 | 0.669 | 1.40 | 1.17 |
| dp | 45.6 | 46.2 | 87.0 | 24.5 | 8.4 | 10.0 |

EXAMPLE II

The procedure of Example I was carried out with Standard Batch II and varius modifications of that batch. The percent pellet survival was obtained with a drying gas at 750 Degrees F. and 100 Actual Feet per Minute flow rate. Results are shown in Table III.

TABLE III

|  | Percent Pellet Survival |
|---|---|
| Standard Batch II | 22% |
| Coarse lime replacing Mississippi lime | 20% |
| Fine lime replacing Mississippi lime | 62% |
| Soft Clark bentonite replacing 30% of the Gleason Clay | 95% |
| Complete replacement of Gleason Clay with Ewing Clay | 95% |

The modified batch system resulted in a 95 percent survival level, compared to 22 percent for the base batch. This was a most significant batch improvement.

EXAMPLE III

Based on the positive results obtained with bentonite, various levels of replacement of Gleason clay with bentonite in Standard Batch II were studied in order to determine if an optimum bentonite concentration existed. Due to the iron limitation in the glass, no more than 35 percent replacement of the Gleason clay with bentonite was considered feasible. This maximum amount of bentonite replacement is equivalent to ten percent by weight of the total batch mixture.

Batches were formulated which contained 0, 1, 2.5, 5 and 10 percent by total batch weight of Soft Clark bentonite, which is low in iron (1.0%) content.

These batch formulations (0-10 percent Soft Clark bentonite) were pelletized on the laboratory disc using established procedures and the spalling characteristic of each batch was determined. Numerous repeat spalling trials were performed with each batch; and Table IV presents a summary of the results obtained, expressed as the average number of pellets which survived at various temperatures (750 degrees F. to 1000 degrees F.) and a constant gas flow rate of 100 Actual Feet per Minute. The data demonstrates a substantial increase in level of pellet survival for bentonite use at five weight percent in the batch; moreover, there is only a slight additional benefit obtained with a ten percent bentonite batch.

TABLE IV

The Effect of the Amount of Soft Clark Bentonite on the Percent of Pellet Survival Drying Gas Temperature with Superficial Gas Velocity Constant at 100 Actual Feet per Minute

| Percentage Soft Clark Bentonite | 750° F. | 800° F. | 900° F. | 1000° F. |
|---|---|---|---|---|
| 0.0 | 22% | 2% | 0% | — |
| 1.0 | 28% | — | — | — |
| 2.5 | — | — | 20% | — |
| 5.0 | 80% | 58% | 63% | 50% |
| 10.0 | 98% | 86% | 68% | — |

The results showed that for 5 total weight percent bentonite contained in the mixed batch, there was a substantial increase in the level of pellets which survived over the base case (zero bentonite) at all temperatures, and that increasing the concentration to 10 weight percent improved the percent of pellet survival obtained with 5 percent bentonite.

EXAMPLE IV

A production trial utilizing a batch formulated with five percent Soft Clark bentonite was initiated. It was felt that this batch formulation would provide the necessary pellet spalling advantages and minimum upset to the pelletization process, while still maintaining furnace performance.

The reason for the significant alteration in the spalling character of a pellet that contains bentonite has not been experimentally verified. The present theory is when a bentonitic clay is mixed with water, it swells to a greater extent than a Kaolin (Gleason) clay. The degree of swelling is believed to be an order of magnitude increase in the bentonite clay particle size which is initially significantly coarser than the standard clay. The bentonite clay particle contained in batch contacts water during pelletization on the disc and swells to some extent. The enlarged bentonite clay particles contained in the wet pellet shrink to their original size during the pellet drying process and therefore produce a more permeable pellet.

The pellet hopper operation responded favorably to the enhanced pellet spalling tendencies. The 5% level of bentonite addition to Standard Batch II essentially eliminated the pellet explosions on the surface of the pellet bed. Particulate sampling of the pellet hopper exhaust showed a marked improvement in stack emissions. The modified bentonite batch almost is equivalent in pellet spalling properties to Standard Batch I, which never has had a pellet spalling problem.

EXAMPLE V

The evaluation of alternative bentonites for Standard Batch II was carried out. The level of pellet survival with Standard Batch II composed of five percent Soft Clark Will be the standard of comparison utilizing the pellet spalling chamber operating at 100 Actual Feet per Minute and various temperatures. Table V presents the base system data, i.e. Soft Clark bentonite, and an evaluation of Millbond bentonite in the batch, both at the same 5 percent concentration.

Comparison of pellet survival at various temperatures indicates that the Millbond bentonite gives slightly better results than the Soft Clark bentonite batch. Moreover, by replacing Mississippi limestone with the finer CCC limestone in a batch including the five percent Millbond bentonite produced pellets which possessed a greater number of pellet survivors than the batch with the coarser Mississippi limestone. This reproduces the known advantage of finer limestone and demonstrates that the effect is additive over the benefits of bentonite. It is not only the clay particle size which is important, but the overall particle size disparity in the composite batch which is the key variable that affects finished pellet density.

TABLE V

Comparison of Millbond Bentonite in Standard Batch II Drying Gas Temperature with Superficial Velocity of 100 Actual Feet per Minute Contacting Green Pellets

|  | 750° F. | 800° F. | 900° F. |
| --- | --- | --- | --- |
| 5% Soft Clark | 80% | 58% | 63% |
| 5% Millbond | 93% | 89% | 70% |
| 5% Millbond with Fine CCC Limestone replacing SMC Limestone |  |  | 88% |

TABLE V-continued

Comparison of Millbond Bentonite in Standard Batch II Drying Gas Temperature with Superficial Velocity of 100 Actual Feet per Minute Contacting Green Pellets

EXAMPLE VI

Environmental tests were carried out using Standard Batch II which included 10% by weight Soft Clark bentonite. These tests were conducted at a textile glass melting and glass fiber manufacturing plant while the furnace was engaged in the normal production of molten glass for the manufacture of glass fibers. Pelletized glass batch was fed to the furnace from a hopper and exhaust gas from the furnace was introduced into the lower end of the hopper for travel upwardly through the bed of pellets to preheat the pellets prior to their introduction into the furnace, as described in the application. The pellets utilized in the tests were produced in accordance with the disclosure of this application. The pellets utilized in the tests were characterized as "wet" and contained 16% to 17% water.

The pellets were fed to the hopper at a rate of approximately 14,000 pounds per hour, on a dry basis.

The environmental testing was carried out in accordance with procedures and standards defined by the U.S.E.P.A. and published in the Federal Register, Volume 36, No. 247, dated Nov. 23, 1971, as amended and revised in the Federal Register, Volume 42, No. 160, dated Aug. 18, 1977, and specified as test methods 1 through 5.

The stack analysis yielded 11.9 pounds per hour, whereas environmental testing carried out on the same furnace when Stndard Batch II was employed yielded 51.0 pounds per hour. This data demonstrates a reduction in stack emissions by as much as 77%.

INDUSTRIAL APPLICABILITY

Agglomerating glass batch is produced in an agglomerator which is any conventional piece of equipment available in the art for combining glass forming batch ingredients and water into agglomerates. Typically, the amount of water in the agglomerates will range from 5 to 20 percent by weight. Preferably, the agglomerator will be a conventional rotary disk pelletizer. When manufacturing pellets, it is preferred to pass the pellets through a suitable sizing device such that the pellets to be further processed generally have a maximum dimension in the range of about ¼ to 1 inch and most desirably between ⅜ to about ⅝ inch. The agglomerated glass batch initially is at room temperature and is continuously fed countercurrently to the flow of exhaust gas in the preheat hopper.

In operation, combustion gas is introduced into the lower part of the preheat hopper. Agglomerated glass batch is introduced into the upper part of the preheat hopper. The flow of the gases and agglomerated batch countercurrent to each other. The dried agglomerates exit through the bottom of the preheat hopper and the cool gases exit through the top of the preheat hopper. A blower or fan may be employed to pull the exhaust gases from the preheat hopper or to maintain a negative pressure in the hopper. The pellets or agglomerates are heated to a temperature ranging from about 900° F. to 1250° F. by this exchange.

The agglomerated batch is continuously fed countercurrently to a flow of hot exhaust gas in the preheat hopper. The preheat hopper is an upright cylindrical chamber with a conical bottom having a pellet inlet and a gas outlet at the top and a pellet outlet and gas inlet at the bottom. The temperature of the gas is about 1200° F. While in the preheat hopper, the pellets and hot exhaust gas are intimately contacted for a time sufficient to heat the agglomerates as described above. The agglomerates then are fed to a glass melting furnace. These agglomerates must be produced from a raw material compliment which results in a pellet with reduced spalling tendencies so that particulate emissions are negligible.

I claim:

1. In a process for producing glass by charging to a melting furnace and melting therein a batch comprising the steps of agglomerating the batch using a liquid, charging the wet agglomerates onto the upper surface of a vertical bed preheat hopper having a lower discharge end communicating with the furnace, substantially simultaneously (1) withdrawing agglomerates through said lower discharge end for charging to the furnace, (2) moving the remaining agglomerates by gravity downwardly through the bed, (3) passing the hot furnace exhaust gas upwardly through the bed to heat the agglomerates therein, and (4) drying the wet agglomerates on the upper region of the bed with spent exhaust gas which was already passed through the bed, wherein the agglomerated batch contains a sufficient amount of clay having a coarse particle size which results in an agglomerate having insufficient pore volume to induce the drying of step (4) and reduce the agglomerate's spalling tendencies.

2. A process according to claim 12 wherein the clay having a coarse particle size is bentonite.

3. A process according to claim 1 wherein the amount of clay having a coarse particle size ranges up to 35% by weight of the agglomerates.

4. A process according to claim 3 wherein the amount of clay having a coarse particle size ranges up to 10% by weight.

5. A process according to claim 3 wherein the amount of clay having a coarse particle size ranges from 5 to 10% by weight.

6. In a process for producing glass by charging to a melting furnace and melting therein a batch comprising the steps of agglomerating the batch using a liquid, charging the wet agglomerates onto the upper surface of a vertical bed preheat hopper having a lower discharge end communicating with the furnace, substantially simultaneously (1) withdrawing agglomerates through said lower discharge end for charging to the furnace, (2) moving the remaining agglomerates by gravity downwardly through the bed, (3) passing the hot furnace exhaust gas upwardly through the bed to heat the agglomerates therein, and (4) drying the wet agglomerates on the upper region of the bed with spent exhaust gas which has already passed through the bed, wherein the agglomerated batch contains both a sufficient amount of clay having a coarse particle size to induce the drying of step (4) and reduce the agglomerate's spalling tendencies and fine limestone to reduce overall batch particle size disparity, thereby further increasing the pellet pore volume to reduce the agglomerate's spalling tendencies.

7. A process according to claim 6 wherein the clay having a coarse particle size is bentonite.

8. A process according to claim 6 wherein the amount of clay having a coarse particle size ranges up to 10% by weight of the agglomerates.

9. A process according to claim 6 wherein the amount of clay having a coarse particle size ranges from 5 to 10% by weight of the agglomerates.

* * * * *